Aug. 25, 1931.  A. H. NEULAND  1,820,864
ELECTRIC SYSTEM FOR VEHICLES
Filed July 31, 1928
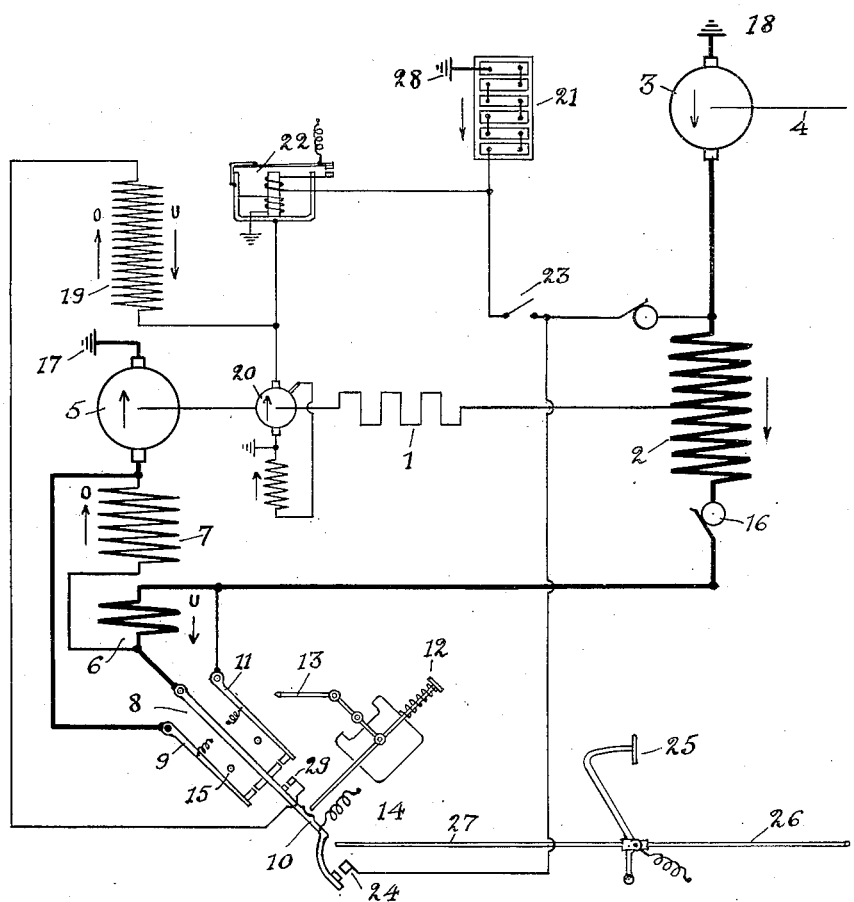
Alfons H. Neuland
INVENTOR Patented Aug. 25, 1931

1,820,864

UNITED STATES PATENT OFFICE

ALFONS HENRY NEULAND, OF IRVINGTON, NEW JERSEY, ASSIGNOR TO ELECTRO-MOBILE CORPORATION, OF IRVINGTON, NEW JERSEY

ELECTRIC SYSTEM FOR VEHICLES

Application filed July 31, 1928. Serial No. 296,468.

This invention relates to improved methods and means for electromagnetically transmitting power from a prime mover to a load and particularly to the type of apparatus in which two dynamos cooperate with the power source and load for transmitting power therebetween.

In my copending application Serial 294,993 filed July 24, 1928, for electric system for vehicles, I disclosed a method for varying the torque and speed relationships by reversing the field of one of the dynamos automatically or by movement of the engine throttle mechanism.

The objects of my present invention are to vary and reverse the booster magnetization within wide limits by movement of the throttle mechanism, allowing the operator to greatly vary the engine speed.

Other objects are to provide an apparatus particularly adapted for operating a vehicle with an internal combustion engine, to provide circuits and means cooperating with the vehicle brake mechanism for starting engine from a battery and to provide for stabilization during light loads.

Still other objects and advantages of the system will appear from the following description and appended drawing.

The single figure of the accompanying drawing is a wiring diagram showing schematically the relationship between the electrical and mechanical elements of my system and the engine, propeller, accelerator and brake on the vehicle.

Referring to the drawing, the vehicle engine is represented by the crank shaft 1 which drives the series field coil 2 mounted on the field system of the clutch dynamo. The clutch armature 3 is connected to and drives the propeller shaft of the vehicle represented by 4. The booster dynamo has an armature 5 operatively connected to engine shaft. The booster field system is provided with a series coil 6 of relatively few turns with respect to the coil 2, connected to establish a motoring flux, and with a series coil 7 having a greater number of turns than coil 6 and connected reversely so as to establish a generating flux. The relationship between the series turns in the clutch and booster field coils is described and broadly claimed in my application Serial #294,993 filed July 24, 1928. A special switch 8 is provided having its contact fingers 9, 10 and 11 connected to the coils 6 and 7. The accelerator 12 has a suitable rod connection 13 to the engine throttle, not shown, and is arranged to cooperate with the switch 8 so that when the accelerator is released the spring 14 pulls the contact finger 10 up, short circuits the coil 6 and opens circuits the coil 7 as the finger 9 reaches the stop 15. At the same time the finger 10 contacts with contact button 24 and short circuits the clutch coil 2. The load circuit is represented by the heavy line the current, when originating in armature 3 flows thru coil 2 slip ring 16, thru coils 6 or 7, depending on position of switch, thru armature 5 and thru the grounds 17 and 18 back to armature 3. The booster field is also provided with a shunt coil 19 connected to receive a small current from the armature 3 when it underspeeds the engine, from armature 5 during the overspeeding period and from a small regulating and charging generator armature 20 during transition. I also employ this generator for charging the battery 21 thru the cutout 22. The combinations of a control generator and battery are claimed in my copending applications Serial #292,194 filed July 12, 1928 and Serial #294,993 filed July 24, 1928. Various circuits are established with the starting switch 23 and control contact 24 to start the engine from the battery, and to control the power flow in cooperation with the brake pedal 25 having a suitable connection with the vehicle brakes, not shown, such as the rod 26.

In my copending application Serial #294,993 filed July 24, 1928 for electric system for vehicles and application #219,226 filed Sept. 13, 1927, I have fully described the stabilizing and magnetizing action of the coil 19 and the function of regulator 20. In the present invention I provide a suitable connection between the brake mechanism 25 and the switch 8 such as the rod 27 which, when the brake pedal 25 is depressed, serves to short circuit the generating coil 7, and to open the motoring coil 6 and the clutch coil 2.

To operate the vehicle with the system the operator depresses starting switch 23 to start engine but he must also depress brake pedal 25 in order to lock the vehicle brakes. This opens the contacts 24 and 10 and establishes a current flow thru armature 3 and grounds 18 and 28 back to battery and another current flow thru coil 2 and the booster coil 6 for the reason that depression of the brake lever opens the coil 6 and closes coil 7. The current continues thru the armature 5 returning to battery by way of the grounds 17 and 28. Both clutch and booster exert a torque in direction of engine rotation and set engine in operation. When engine has started operator may release his brake pedal without danger of starting the vehicle as the contacts 10 and 24 now keep the clutch field 2 short circuited and the clutch inactive.

The above combination for starting the engine from a battery is broadly claimed in my application Serial #219,226 filed Sept. 13, 1927.

To set the vehicle in motion the operator need but depress the accelerator 12 to open contacts 10 and 24 and the clutch short circuit, allowing the clutch to exert a torque on propeller. His movement of accelerator also slightly increases the throttle opening and engine torque and so prevents the sudden torque application from stalling engine. I prefer to adjust the accelerator so that the throttle may be partly opened before short circuiting the coil 7. This adjustment permits relatively low and economical engine speeds over a considerable range of operation and particularly at low vehicle speeds.

If the operator wishes to accelerate rapidly or to take a grade he need but further depress the accelerator button 12 which then short circuits the coil 7 before coil 6 opens. The bulk of the load current from coil 2 passes between the contacts 11 and 9 directly to the armature 5; any minor portion of load current passing thru the coils 6 and 7 is neutralized by their opposition to each other and results in a direct transference of engine torque to propeller. A further depression opens the coil 6, causes booster to develop motor action and supplying another torque to propeller in addition to that developed by the engine. In this connection it should be noted that I proportion the coil 6 with respect to clutch coil 2 so that with wide open throttle and the vehicle at rest, the motor torque developed by the booster is equal to the difference between the torque requirement of the load and torque ability of engine and so that the clutch torque is equal to the sum of engine and booster torques. This allows the operator to release the maximum predetermined torque at start, by merely depressing his accelerator and aided by switch 8, enables him to operate the vehicle and to control the engine speed with little effort, by merely manipulating his accelerator. As he releases his accelerator the switch 8 operating in reverse sequence, first closing coil 6 and thereafter opening coil 7 whereupon the booster becomes a generator takes over the energization of the circuit and causes the propeller shaft to overspeed the engine. It is seen that my method of controlling the booster field is efficient for the reason that current flows only in one of the coils as needed or in neither reducing the loss in the load circuit to a minimum. The coil 19 is not essential for the operation of my system and may in some instances be omitted, but is useful in that it supplies a portion of the booster magnetization in both directions, depending on whether propeller overspeeds or underspeeds engine, and so reduces the energy to be handled by the switch 8. When the coil 19 is relatively strong compared with coils 6 and 7 I provide a contact 29 to open its circuit before the throttle is fully opened. This prevents the booster motoring field from becoming too powerful and reversing the load current, and the engine from speeding up at too great a rate during the underspeeding period. The coil 19, in cooperation with the regulator armature 20 is also useful in aiding stabilization during light load periods while its circuit remains closed thru the contacts 29 and 10. This is described at length and is broadly claimed in my copending application last mentioned.

The broad feature of energizing an electric transmission system is broadly claimed in my copending application Serial #219,227 filed Sept. 13, 1927.

From the foregoing description it will be seen that whenever during operation of the vehicle the accelerator is released, the clutch field coil 2 is short circuited by the closure of contacts 10 and 24, instantly interrupting power flow to propeller and in case of emergency an additional safety measure is provided by the connection 27 which, when the operator depresses brake pedal 25, short circuits the coil 7 and minimizes or stops booster generation.

While I have herein shown a complete system embodying my invention and described its operation in conenction with a motor vehicle I desire to have it understood that my invention is adapted to other uses and that it may be used in whole or in part in the described or other embodiments within the principle and scope of my invenion.

Having described my invention, what I claim and desire to secure by Letters Patent is:

1. In a transmission system, an internal combustion engine, a load shaft, a clutch dynamo interposed between engine and load shaft, a booster dynamo operatively connected to engine and provided with a plurality of field coils, conductors for establishing a load circuit between the dynamos and a switch operative in one position to conduct current thru one of the field coils for operation of booster as a motor and in another position to conduct current thru another field coil for operation of booster as a generator.

2. In a transmission system, an internal combustion engine, a load shaft, a clutch dynamo interposed between engine and load shaft, a booster dynamo operatively connected to engine and provided with a plurality of field coils, conductors for establishing a load circuit between the dynamos and for passing the load curent thru the field coils in opposite directions, and a switch serving in one position to short circuit one of the field coils for operation of booster as a motor and in another position to open the first coil and short circuit another coil for operation of booster as a generator.

3. In a transmission system, an internal combustion engine, an engine throttle mechanism, a load shaft, a clutch dynamo interposed between engine and load shaft, a booster dynamo operatively connected to engine and provided with a plurality of field coils, conductors for establishing a load circuit between the dynamos and for passing the load current thru the field coils in opposite directions, and a switch operative by the movement of the throttle mechanism in one position to conduit current thru one field coil for operation of the booster as a generator and in another position to conduct current thru another field coil for operation of booster as a motor.

4. In a transmission system, an internal combustion engine, a load shaft, a clutch dynamo interposed between engine and load shaft, a booster dynamo operatively connected to engine and provided with a plurality of field coils, conductors for establishing a load circuit between the dynamos, a switch operative in one position to conduct load current thru one of the field coils for operation of booster as a motor and in another position to conduct load current thru another field coil for operation of boosters as a generator and conductors for connecting still another field coil to receive shunt current from one of the dynamos.

5. In a transmission system, an internal combustion engine, a load shaft, a clutch dynamo interposed between engine and load shaft, a booster dynamo operatively connected to engine and having a motoring field coil with relatively few turns and a generating field coil with relatively many turns, and a switch operative in one position to conduct load current thru the motoring coil and in another position thru the generating coil.

6. In a transmission system, an internal combustion engine, a load shaft, a clutch dynamo interposed between engine and load shaft provided with a field coil of relatively many turns adapted to be traversed with load current, a booster dynamo operatively connected to engine and provided with a motoring field coil of relatively few turns with respect to clutch coil and a generating field coil of relatively many turns with respect to motoring coil, conductors for passing load current thru the motoring coil for multiplying engine torque to load shaft and in another position to conduct load current thru the generating coil for operating load shaft faster than engine.

7. In combination, an engine having a shaft, a load shaft, a generator having a field element, a motor electrically connected with the generator for transmitting power between the shafts, means including a source of current for magnetizing the field element and means including a switch for assisting the magnetization of field element with load current in one stage of operation and for opposing the magnetization of field element with load current in another stage.

8. In combination, an engine having a shaft, a load shaft, a dynamo rotatively connected with one of the shafts having a field element, a second dynamo rotatively connected with both shafts and electrically connected with first dynamo, means including a switch for magnetizing the field element in generating direction with load current from first dynamo in one stage and for magnetizing field element in motoring direction with load current from second dynamo in another stage, and a source of current for magnetizing the field element in generating direction when load current in the dynamos approaches zero.

9. In combination, an engine having a shaft, a load shaft, a dynamo having a field element, a second dynamo electrically connected with the first dynamo for transmitting power between the shafts, means for magnetizing the field element in generating direction with load current from first dynamo in one stage and in motoring direction with load current from second dynamo in another stage, a regulating dynamo for magnetizing the field element in generating direction when load current approaches zero, and means for varying the speed of regulating dynamo operative to vary magnetization of the field element.

10. In combination, an engine having a shaft and a throttle mechanism, a load shaft, a dynamo having a series field coil and an auxiliary field coil, a second dynamo electrically connected with the first dynamo for transmitting power between the shafts having a series field coil, a regulating dynamo connected with the auxiliary field coil, connectors for passing load current thru the series field coils, and means including the throttle mechanism for varying current in the series field coil of one dynamo with respect to current in the series field coil of the other dynamo.

11. In combination, an engine having a shaft and an engine throttle mechanism, a load shaft, a dynamo rotatively connected with both shafts, a compound motor rotatively connected to engine, and means operative by the movement of the throttle mechanism for changing the compound motor to operate as a compound generator.

12. In combination, an engine shaft, a load shaft, a brake mechanism, a dynamo rotatively connected with both shafts, a generator rotatively connected to engine shaft, and means operative by the movement of the brake mechanism for changing the generator magnetization.

13. In combination, an engine shaft, a load shaft, a brake mechanism, a dynamo rotatively connected with both shafts, a second dynamo rotatively connected with one of the shafts having a field coil, conductors for passing load current thru the field coil, and a switch operative by the movement of the brake mechanism for short circuiting the field coil of second dynamo.

14. In combination, an engine shaft, a load shaft, an engine throttle mechanism, a dynamo rotatively connected with both shafts having a field coil, a second dynamo rotatively connected with one of the shafts, conductors for passing load current thru the field coil, and a switch operative by the movement of the throttle mechanism for shortcircuiting the field of the first dynamo.

15. In combination an engine having a shaft and a throttle mechanism, a load shaft, a dynamo rotatively connected with both shafts having a field coil, a second dynamo rotatively connected with one of the shafts having a field coil, conductors for passing load current thru the field coils, and a switch operative by the movement of the throttle mechanism in one position to shortcircuit the field of first dynamo and in another position to shortcircuit the field coil of second dynamo.

16. In combination, an engine having a shaft, a load shaft, a dynamo rotatively connected with both shafts having a field coil, a second dynamo rotatively connected with one of the shafts having a field coil, and means for shortcircuiting the field coil of first dynamo in one stage, for passing load current thru both field coils in another stage and for shortcircuiting field coil of second dynamo in still another stage.

17. In combination, an engine having a shaft, a load shaft, a brake mechanism, a dynamo rotatively connected with both shafts having a field coil, a second dynamo rotatively connected with one of the shafts having a field coil, a battery, a switch for connecting battery with dynamos to start engine, and a second switch operative by movement of brake mechanism in one position to pass battery current thru field coil of second dynamo and in another position to short-circuit field coil of first dynamo.

18. In combination, an engine shaft, a load shaft, a dynamo rotatively connected with both shafts, a second dynamo rotatively connected with one of the shafts having a field element, means including a switch when in one position to magnetize the field element with load current in motoring direction and when in another position to magnetize the field element with load current in generating direction, and an auxiliary dynamo for magnetizing the field element in generating direction.

19. In combination, an engine having a shaft and a throttle mechanism, a load shaft, a dynamo rotatively connected with both shafts, having a load field coil, a second dynamo rotatively connected with one of the shafts having a load field coil and a shunt field coil, conductors for passing load current thru the load field coils, means operative by the movement of the throttle mechanism for varying load current in load coil of one dynamo with respect to load current in load coil of the other dynamo, conductors for impressing the shunt coil with potential from one of the dynamos and an auxiliary generator in circuit with the shunt coil.

20. In combination, an internal combustion engine having an engine shaft and an engine throttle mechanism, a load shaft, a dynamo rotatively connected with both shafts, a second dynamo rotatively connected with one of the shafts, a load circuit including the dynamos, a source of current connected with one of the dynamos, and means operative by the movement of the throttle mechanism for short-circuiting a portion of the load circuit.

21. In a transmission system, an internal combustion engine having a shaft and a throttle mechanism, a load shaft, a generator rotatively connected with the engine and load shafts having a series field coil, a motor rotatively connected with engine shaft having a series field coil, and means for establishing a certain relationship between the currents in the generator and motor field coils with one throttle opening and for establishing a different current relationship with another throttle opening.

22. In combination, an engine shaft, a load shaft, a dynamo rotatively associated with one of the shafts having a field element, a second dynamo rotatively associated with the other shaft and cooperating with the first dynamo to transmit power between the shafts, means for magnetizing the field element with load current for operation of first dynamo as a generator in one stage, means for changing the first dynamo from a generator to a motor for operation in another stage, and a source of current for maintaining magnetization in the field element when load current in the dynamos approaches zero during operation of first dynamo as a generator and for maintaining magnetization in the field element in the same direction when current in the dynamos approaches zero during operation of the first dynamo as a motor.

23. In combination, an internal combustion engine having a shaft and a throttle mechanism, a load shaft, two dynamo electric machines adapted to transmit power between the shafts, means including a separate source of current for stabilizing the dynamos, and means including a switch operated by the movement of the throttle mechanism for varying the speed and torque relationship between the shafts.

24. In combination, an engine having a shaft and a throttle mechanism, a load shaft, a dynamo connected with one of the shafts having a field element, a second dynamo cooperating with the first dynamo for transmitting power between the shafts, means including a separate source of current for maintaining magnetization in the field element when power flow between the shafts ceases, and means including a switch operated by the movement of the throttle mechanism for varying the magnetization of the field element.

25. In combination, an internal combustion engine having a shaft and a throttle mechanism, a load shaft, a dynamo connected with the engine shaft having a field element and a field coil, a second dynamo cooperating with the first dynamo for transmitting power between the shafts, an auxiliary generator connected with the field coil, and means including a switch operated by the movement of the throttle mechanism operative to increase engine speed when the switch is in one position and to decrease engine speed when the switch is in another position.

26. In combination, an internal combustion engine having a shaft and a throttle mechanism, a load shaft, a dynamo connected with one of the shafts having a field element, a second dynamo connected with the other shaft having a field element, means including a separate source of current for maintaining magnetization in one of the field elements when power flow between the shafts ceases, and means including a switch operated by the movement of the throttle mechanism for reversing the voltage with respect to the current in one of the dynamos.

Signed at Newark in the county of Essex and State of New Jersey July A. D. 1928.

ALFONS HENRY NEULAND.